(12) United States Patent
Kron et al.

(10) Patent No.: US 6,541,563 B2
(45) Date of Patent: Apr. 1, 2003

(54) METHOD FOR PRODUCING FLUOROALKYL-FUNCTIONALIZED SILANE COATINGS

(75) Inventors: Johanna Kron, Eussenheim (DE); Karl Deichmann, Würzburg (DE); Gerhard Schottner, Heilsbronn (DE)

(73) Assignee: Fraunhofer-Gesellschaft zur Forderung der angewandten Forschung e.V., Munich (DE)

( * ) Notice: Subject to any disclaimer, the term of this patent is extended or adjusted under 35 U.S.C. 154(b) by 0 days.

(21) Appl. No.: 09/971,238

(22) Filed: Oct. 4, 2001

(65) Prior Publication Data

US 2002/0081385 A1 Jun. 27, 2002

(30) Foreign Application Priority Data

Oct. 10, 2000 (DE) .......................................... 100 50 064

(51) Int. Cl.⁷ ............................................... C08L 83/04
(52) U.S. Cl. ........................... 524/588; 528/33; 528/25; 528/12; 528/42; 528/32; 525/474
(58) Field of Search ............................... 528/33, 25, 12, 528/42, 32; 525/474; 524/588

(56) References Cited

U.S. PATENT DOCUMENTS 5,644,014 A    7/1997   Schmidt et al.
6,071,475 A *  6/2000   Schmidt et al.

FOREIGN PATENT DOCUMENTS

DE    38 28 098 A1    3/1990
DE    41 18 184 A1   12/1992
DE    43 03 570 C2    8/1994
DE   195 01 093 C2    7/1996

* cited by examiner

Primary Examiner—Robert Dawson
Assistant Examiner—Kuo-Liang Peng
(74) Attorney, Agent, or Firm—Leydig, Voit & Mayer, Ltd.

(57) ABSTRACT

The invention concerns a method for producing fluoroalkyl-functionalized hybrid polymer coatings with low surface energy and low tendency to become soiled. Organically modified silanes, metal compounds of formula $AlR_3$ or $MR_4$ and at least partially fluorinated organic modified silane serve as components of the coating composition.

15 Claims, 4 Drawing Sheets

METHOD FOR PRODUCING FLUOROALKYL-FUNCTIONALIZED SILANE COATINGS

The invention concerns a method for producing fluoroalkyl-functionalized hybrid polymer coatings with low surface energy and low tendency to become soiled.

Functional hybrid polymer coatings are becoming increasingly important in fields of application in which properties of scratch resistance, abrasion resistance and chemical resistance or even UV absorption are required. Coatings of this kind are also increasingly being used in corrosion protection and in thermal insulation.

Important criteria for the quality of such coatings are a low surface energy and low tendency toward soiling. The use of such coatings is possible for many substrates. These include plastics, metals, glasses, ceramics and wood, as well as other nonmetallic inorganic or organic substrates.

Among these coatings, fluoroalkyl-functionalized silanes, which enable permanent protection of a surface against soilings of any kind, stand out in particular.

According to the prior art, highly scratch-resistant and highly wear-resistant coatings are known from DE 38 28 098. However, these coatings have the disadvantage that the optical properties of the surfaces often do not satisfy the high demands on such coatings, because optical deficiencies form (so called fish eyes).

DE 198 40 009 describes the production of UV-hardening sols, that can be applied very readily by flow coating and—for nonmetallic substrates—even by immersion, but spray application (important for geometrically complex objects), and immersion of metal substrates are not possible in this case, since the sols turn to gels very rapidly through contact with metals.

DE 41 18 184 describes a coating composition based on fluorine-containing inorganic polycondensates. In the process of producing these coatings described there the addition of the fluorinated starting compounds is a very critical point in process. Here the addition can take place only at a precisely defined point in time, between a precondensation step and the end condensation step, so that the condensation process has to be interrupted and because of this the process becomes more costly.

For this reason the invention is based on the task of developing a method for producing low soiling coatings that remedies the disadvantages of the prior art.

Figure 1:
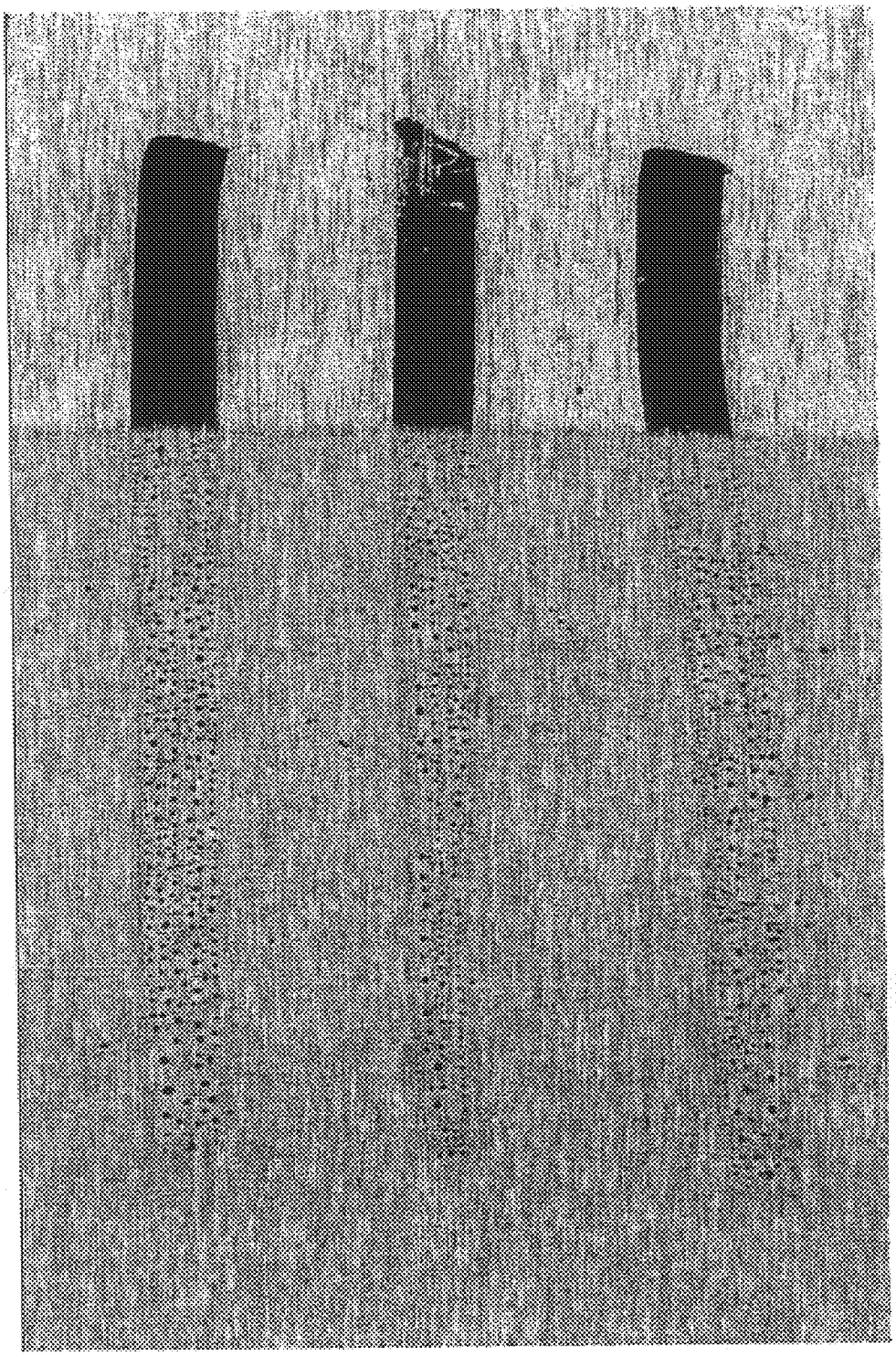
FIG. 1: Pattern of an ink written on a pigmented surface according to the present invention.

The method for producing a coating composition in accordance with the invention is based on a hydrolytic condensation of the following components:

a) at least one organically modified silane of the general formula I $$R'_m SiX_{(4-m)};$$

here X is selected from the group
hydrogen, halogen, alkoxy, acyloxy, alkylcarbonyl, alkoxycarbonyl or NR''$_2$, with R'' being hydrogen and/or alkyl and R' is selected from the group
alkyl, alkenyl, alkynyl, aryl, arylalkyl, alkylaryl, arylalkenyl, alkenylaryl, arylalkynyl or alkynylaryl.

Residues R' can be interrupted by O and/or by S atoms and/or by the group NR'' and can have one or more substituents from among the halogens and optionally substituted amino, amide, aldehyde, keto, alkylcarbonyl, carboxy, mercapto, cyano, hydroxy, alkoxy, alkoxycarbonyl, sulfonic acid, phosphoric acid, (meth)acryloxy, epoxy or vinyl groups.

m can have the values 1, 2 or 3.

At least one organically modified silane of formula I with at least one residue R' that contains at least one (poly)addable and/or polymerizable group is used in an amount from 2 to 95 mol %, with respect to the total number of mols of the monomer starting components.

b) at least one metal compound of the general formula II and/or III $$AlR_3 \quad (II)$$
$$MR_4 \quad (III)$$

in which the residues are the same or different and have the following meanings:

M=zirconium or titanium and R is selected from the group consisting of halogen, alkyl, alkoxy, acyloxy, hydroxy or a chelate ligand, where the compounds of formulas II and/or III are used in an amount from 5 to 75 mol %, with respect to the total number of mols of the monomer starting components.

c) at least one organically modified silane of the general formula IV, $$R'''_m X_{(4-m)} \quad (IV)$$

in which the residues are the same or different and have the following meanings:

R'''=alkyl, alkenyl, alkynyl, aryl, arylalkyl, alkylaryl, arylalkenyl, alkenylaryl, arylalkynyl or alkynyllaryl.

The residues R''' can be interrupted by O and/or by S atoms and/or by the group NR'' and can have one or more substituents from the group consisting of the halogens and optionally substituted amino, amide, aldehyde, keto, alkylcarbonyl, carboxy, mercapto, cyano, hydroxy, alkoxy, alkoxycarbonyl, sulfonic acid, phosphoric acid, (meth)acryloxy, epoxy or vinyl groups. Here the residue R''' is at least partially fluorinated.

These residues R''' can be formed, for example, by condensation of silane-containing reagents with the following conmmercially available reagents: heptafluorobutyric acid, 1H,1H-heptafluoro-1-butanol, 1H,1H,7H-dodecafluoro-1-heptanol, perfluoroheptanoic acid, pentadecafluorooctanoic acid or perfluorononanoic acid.

X is selected from the group consisting of hydrogen, halogen, alkoxy, acyloxy, alkylcarbonyl, alkoxycarbonyl or NR''$_2$, with R'' being equal to hydrogen and/or alkyl.

m can have values of 1, 2 or 3.

Examples of compounds of Type IV are 1H,1H,1H,1H-perfluorooctyldimethylchlorosilane, (3,3,3-trifluoropropyl)dichloromethylsilane and (3,3,3-trifluoropropyl)dimethylmethoxysilane.

The compounds of general formula IV are used in an amount from 0.05 to 50 mol % with respect to the total number of mols of the monomer starting components.

It is important now for the conduct of the method that there is the possibility of conducting the hydrolytic condensation of components (a)–(c) so that either the compound(s)

of formula IV is/are mixed with the compound of formula I and II and/or III before the addition of water or moisture, and then the compounds of I, II and/or III and IV are hydrolyzed and condensed jointly, or the compounds of formulas I and II and/or III are first hydrolyzed and condensed and then the compound(s) of formula IV is/are added to the resulting condensate. The addition at a precise time point during the method is thus no longer necessary in accordance with the invention, which represents a considerable simplification of the industrial course of the method.

Another important point is that after the addition of the compounds of formula IV the resulting mixture can react for at least 6 h, preferably 8 to 12 h, at temperatures of at least 10° C. Surprisingly, this conduct of the process produces sols that lead to layers with particularly high optical quality and no longer have wetting problems (fish eyes). Surfaces of such layers have contact angles of more than 100° with respect to water, about 90° with respect to $CH_2I_2$, and surface energies $\leq$ 20 mN/m. Such a conduct of the reaction is not possible, for example, with hydrolytic condensation in accordance with DE 38 28 098, because of the very low pot lives of these materials (maximum 8 h).

In addition, in the method in accordance with the invention a monomer and/or oligomer and/or prepolymer that is polyaddable and/or copolymerable with the residue R' of the compound of general formula I is added in an amount from 2 to 70 mol % with respect to the sum of compounds I to IV during or after the hydrolytic condensation.

As an advantageous further development, at least one other component can be used with the method in accordance with the invention. These components are selected from nonvolatile oxides that are optionally soluble in the reaction medium or compounds of elements of the main groups Ia through Va or their side groups IIb, IIIb, Vb to VIIIb of the periodic system that form such nonvolatile oxides, except for aluminum.

Preferably, the hydrolytic condensation is carried out in the presence of a condensation catalyst and/or a solvent.

Another advantageous development of the method is the addition of moisture-latent adsorbents, water-containing organic solvents, salt hydrates or water-forming systems, with which the amount of water necessary for hydrolytic condensation can be supplied to the process.

Preferably, at least one additive selected from the group consisting of organic diluents, flow control agents, dyes, UV stabilizers, fillers, viscosity regulators, lubricants, wetting agents, suspension agents and oxidation inhibitors, is preferably added before, during or after the hydrolytic condensation.

The method can preferably be developed further by adding, before, during or after the hydrolytic condensation, at least one pigment or particles with a particle size from 1 to 6 μm in an amount from 0.5 to 8 wt %. The addition to the ready-to-use salts can take place by means of conventional dispersion processes. Examples of such pigments or particles are silicas prepared by various methods, such as are commercially available.

Through this an even lower tendency to be soiled can be realized. This effect is described in more detail and demonstrated by means of Example 5.

Preferably, the compounds of formula I are added in an amount from 20 to 90 mol % with respect to the total number of mols of the monomer starting components and the compounds of formulas II and/or III are added in an amount from 5 to 60 mol % with respect to the total number of mols of the monomer starting components. Concentration from 0.1 to 10 mol % with respect to total number of mols of the monomer starting components is preferred for the compounds of formula IV.

Preferably, the resulting mixture after the addition of the compounds of formula IV is mixed for at least 4 h at a temperature of at least 40° C., especially preferably at least 24 h, at a temperature of at least 10° C.

Fluorinated or perfluorinated aliphatic and/or aromatic residues are preferably used as residues R'''.

As an additional advantageous development of the method at least one hardening catalyst is optionally added to the coating composition, then the coating composition is applied to a substrate and hardened chemically, thermally, or by radiation.

The salts prepared in accordance with the invention are excellently suitable as a matrix for soluble dyes, inorganic and organic dye pigments as well as mixtures of various colorants in high concentrations. The resulting layers are characterized by very good optical quality while maintaining the above described surface properties on various substrate surfaces. For example, it becomes possible to make a hybrid coating material that can contain more than 25 wt % color pigments and can thus achieve the covering power needed for commercial acceptance while having the said low layer thicknesses.

Other advantageous developments of the method in accordance with the invention are presented by means of the following figures and embodiment examples.

EXAMPLE 1

212.70 g 3-glycidyloxypropyltrimethoxysilane (GPTMS), 118.98 g phenyltrimethoxysilane (PhTMS), 22.14 g 3-aminopropyltriethoxysilane (AMES) and 10.20 g (tridecafluuoro-1,1,2,2-tetrahydrooctyl-1-triethoxysilane (F13-silane) are mixed under ice cooling. 98.54 g aluminum tris-sec-butylate (Al-s.but) are mixed with 105.68 g 2-butoxyethanol in a separate glass flask, slowly mixed with 52.06 g acetylacetone and added to the reaction mixture. The 128.8 g distilled water are added very slowly. After 2 h of stirring at room temperature 63.28 g epoxy resin and 1.27 g of a flow control agent are added. Then the reaction mixture is allowed to continue to react for 24 h at 25° C. while stirring it. Conventional paint solvents can now be added to establish the paint viscosity (about 10 mPa·sec).

The resulting sol is applied to various substrates by conventional coating methods such as dipping or spray coating. Thermal hardening of the coating material took place at 130 to 200° C., with hardening times between 20 min and 2 h. The coatings produced in this way are colorless, have very good optical quality (no wetting problems) and have very good initial hardness (ASTM 3359 cross hatch adhesion test: B 5; for example on glass or various metal substrates). The good properties of the layers continue to exist even after various weathering tests such as the condensate weathering test in accordance with DIN 50017. These surfaces have contact angle of 96° for water, 76° for $CH_2I_2$, and surface energies of 20 mN/m.

EXAMPLE 2

307.24 g GPTMS, 39.66 g PhTMS, 22.14 g AMES and 6.1 g 1H,1H,2H,2H-perfluoroalkyl-1-triethoxysilane (F13-21-silane) are mixed under ice cooling. In a separate glass flask 98.54 g Al-s.but are mixed with 105.68 g 2-butoxyethanol, slowly mixed with 52.06 g acetoacetate and added to the reaction solution. Then 128.8 g distilled water are added very slowly under ice cooling. After 2 h of stirring at room temperature 63.28 g epoxy resin and 1.27 g of a flow control agent are added. Now the reaction mixture is allowed to continue to react for 4 h at 40° C. while stirring it. To establish the paint viscosity (about 10 mPa·sec), conventional paint solvents can now be added.

The coating process and hardening of the layers is analogous to Example 1. The correspondingly prepared coatings are likewise colorless, have very good optical quality (not wetting problems) and exhibit very good adhesion even after various weathering tests (for example the ASTM 3359 cross hatch adhesion test is the best value B 5, even after the condensate weathering test in accordance with DIN 50017 on glass and various metal substrates. These surfaces have contact angle of 102° for water, 90° for $CH_2I_2$, and surface energy $\leq$14 mN/mn.

EXAMPLE 3

307.24 g GPTMS, 41.66 g tetraethoxysilane, 22.14 g AMES and 6.1 g 1H,1H,2H,2H-perfluoroalkyl-1-triethoxysilane (F13-21-silane) are reacted with 98.54 g Al-s.but, 105.68 g 2-butoxyethanol, 52.06 g ethyl acetoacetate, 128.8 g distilled water, 63.28 g epoxy resin and 1.27 g of a flow control agent by analogy with Example 2 and processed further by analogy with this same example.

The resulting layers have very good adhesion (for example ASTM 3359 cross hatch adhesion test gives the best value, B 5) and contact angles at 105° for water, 83° for $CH_2I_2$ and surface energies of 16 mN/m.

EXAMPLE 4

The preparation of the coating solution and the application take place as described under Example 1 or 2. However, 6.10 g 1H,1H,2H,2H-perfluorodecyl-o-triethoxysilane (F17-silane) are used as the perfluorinated silane. The resulting layers have an even lower soiling tendency with good layer properties that otherwise remain the same. Contact angles of 103° for water, 91° for $CH_2I_2$, and surface energies $\leq$13 mN/m were measured.

EXAMPLE 5

98.54 g Al-s.but and 105.68 g 2-butoxyethanol are slowly stirred and mixed with 52.06 g ethyl acetoacetate and added, under ice cooling, to a mixture of 212.70 g GPTMS, 118.98 g PhTMS and 22.14 g AMES. The addition of 128.8 g distilled water takes place slowly while cooling the mixture. The hydrolysate is stirred for 2 h at room temperature. Then 63.28 g epoxy resin, 1.27 g of a flow control agent and finally 6.10 g 1H,1H,2H,2H-perfluoroalkyl-1-triethoxysilane (F13-21-silane) are added. Now the reaction mixture is allowed to continue to react for 4 h at 40° C. while stirring it. The further processing and application took place as described under Example 2. The performance of the resulting coatings resembled the samples obtained in Example 2. A similar procedure is also possible while retaining properties for the other two fluorosilanes.

EXAMPLE 6

The coating solution is prepared by analogy with Examples 1 to 5. 0.5–8% pigments with particle size of 1–6 µm (for example commercial silicas) are incorporated into the ready-to-use sols by conventional means of dispersion. The remaining processing is carried out as described under Examples 1 to 4. The resulting layers are, depending on amount of pigment, transparent or translucent and exhibit an additionally reduced soiling tendency.

If, for instance, one writes on a pigmented and unpigmented surface with a commercial water-soluble projector marker, the ink's ability to wet is reduced so much on both surfaces that a uniform film is not formed and the ink collects in drops, but the individual drops on the pigmented surface are smaller, at 25–80 µm, by an entire order of magnitude than the 600–800 µm drops on the unpigmented surface. Thus a correspondingly pigmented layer is not only easier to clean, but even without cleaning appears to be less soiled than a pigment free layer.

Figure 2:
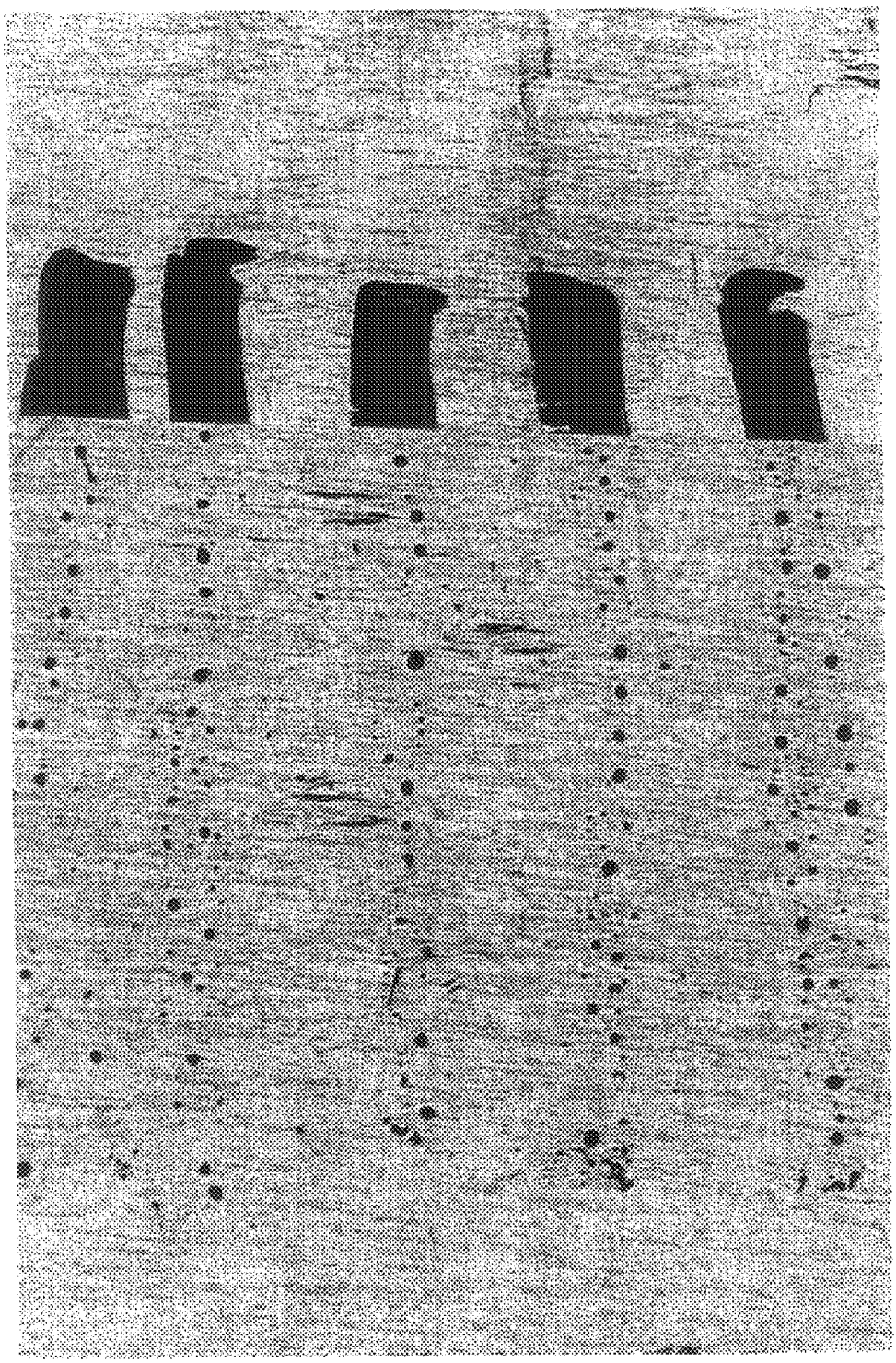
FIG. 2: Pattern of an ink written on an unpigmented surface according to the present invention.
Figure 3:
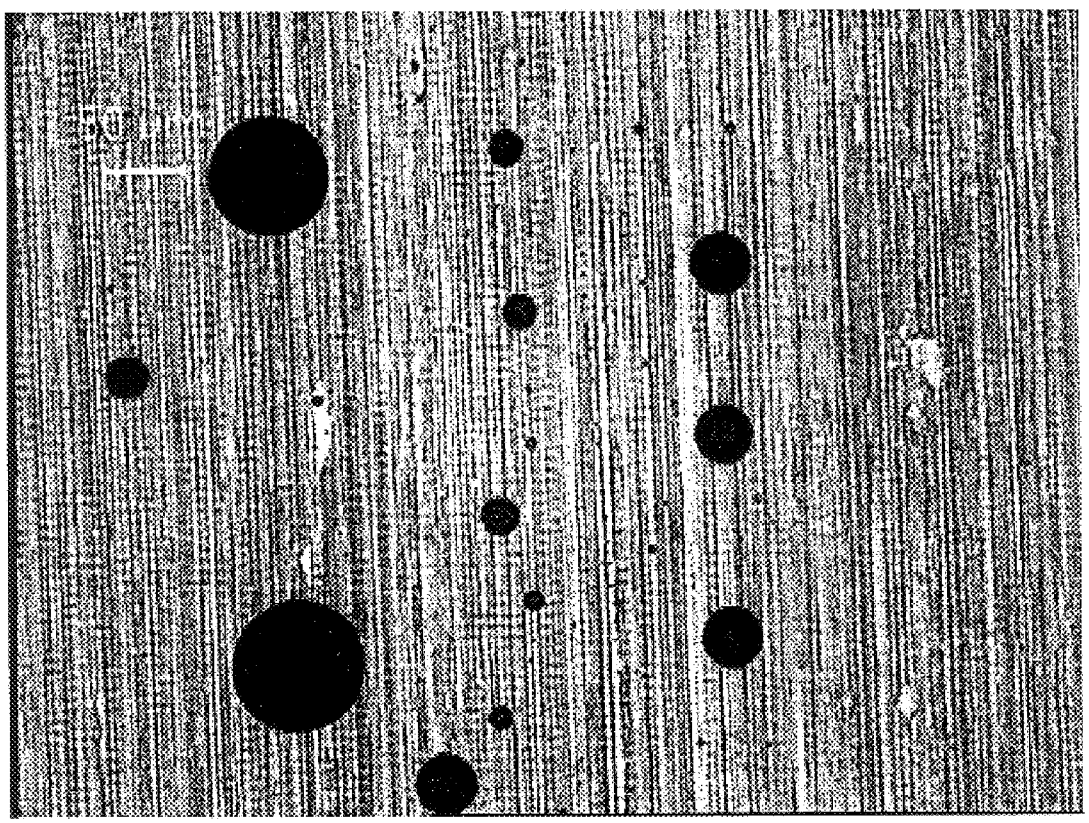
FIG. 3: Ink droplet size on a pigmented surface according to the present invention.
Figure 4:
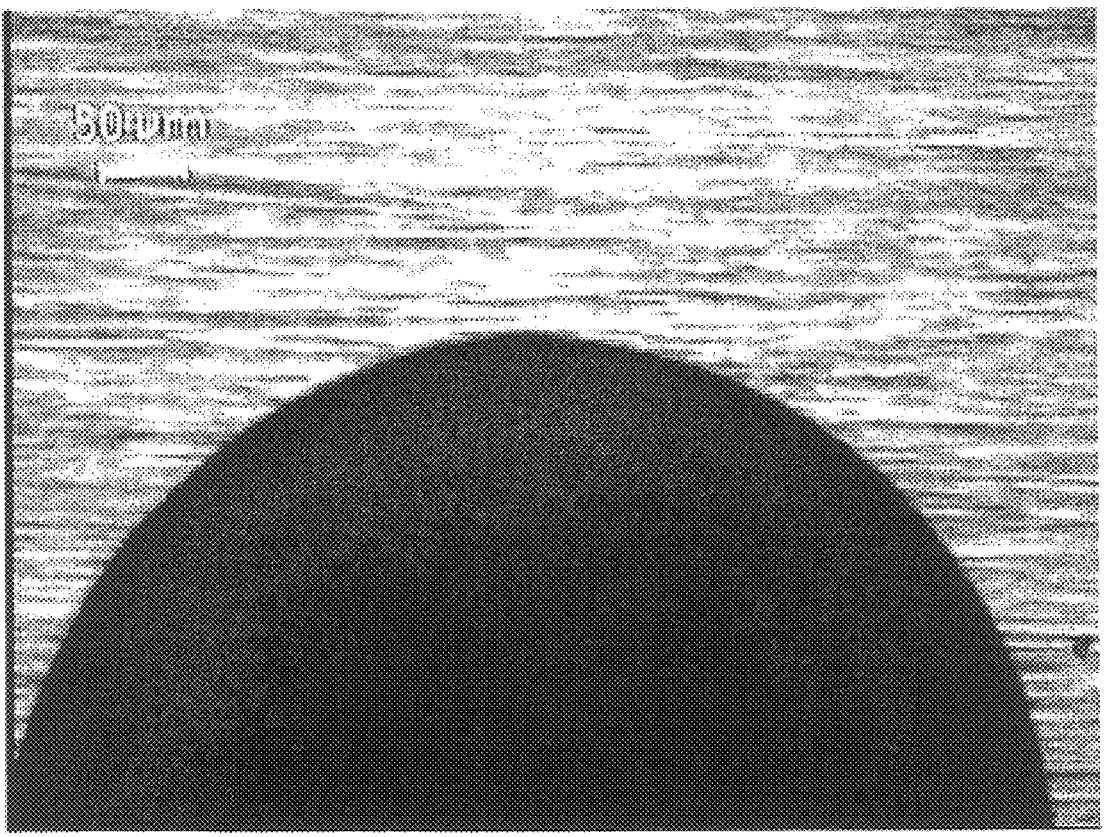
FIG. 4: Ink droplet size on an unpigmented surface according to the present invention.

FIGS. 1 to 4 visually demonstrate this effect. Here comparison was made by writing on pigmented (FIG. 1) and unpigmented (FIG. 2) layers on plastic, stainless steel and glass using a commercially available water-soluble overhead projector pen. Wetting by the ink is reduced so significantly on both surfaces that a uniform film is not formed and the ink coalesces into droplets, but the individual droplets on the pigmented surface (FIG. 3) are, at 25–80 µm, a whole order of magnitude smaller than the droplets on the unpigmented surface (FIG. 4), which are 600–800 µm in size. For this reason a correspondingly pigmented layer is not only easier to clean, but also even without cleaning appears less soiled than a pigment-free layer.

EXAMPLE 7

15 g Orasol® Blue GN and 6 g Orasol® Pink 5 BLG each were dissolved in sols prepared by analogy with Examples 1 to 6. Here there is also the possibility of not adding the perfluoroalkylsilane compounds to the colored sols until the corresponding stirring times are completed (4 h at 40° C. or 16 to 24 h at room temperature). The application and hardening of the colorant solution take place as described in Example 1. The resulting transparent (translucent) layers are cobalt blue and otherwise exhibit the same properties as the colorless layers from Examples 1 to 6. With colorants or colorant mixtures that are soluble in aqueous, alcoholic media, it is possible to produce nearly all color shades in various color depths. The preparation of cobalt blue layers is only one of innumerable examples.

EXAMPLE 8

250 g of the colorant pigment RAL 6024 (Traffic Green) are dispersed in a sol prepared by Example 1 to Example 6. The pigmented sol is processed per by analogy with Example 1. However, there is also the possibility that the perfluoroalkylsilane compounds are not added to the colored sols until the corresponding stirring times are completed (4 h at 40° C. or 16 to 24 h at room temperature). The resulting opaque green layers exhibit the surface properties corresponding to the colorless layers from Examples 1 to 6 and are equally resistant. Here, too, the preparation of the green layers with color RAL 6024 is only one of innumerable examples showing that translucent to opaque paint layers can be prepared in nearly all shades and various degrees of coverage by mixing various colorant pigments.

What is claimed is:

1. A method for producing a coating composition with the following characteristics:

through the addition of water or moisture a hydrolytic condensation of at least the following components is carried out:

a) at least one organically modified silane of the general formula I $$R'_m SiX_{(4-m)} \qquad (I)$$

in which the residues are the same or different and have the following meanings:

X=hydrogen, halogen, alkoxy, acyloxy, alkylcarbonyl, alkoxycarbonyl or $NR''_2$, with R" being hydrogen and/or alkyl;

R'=alkyl, alkenyl, alkynyl, aryl, arylalkyl, alkylaryl, arylalkenyl, alkenylaryl, arylalkynyl or alkynylaryl, where these residues can be interrupted by O and/or by S atoms and/or by the group NR" and optionally have one or more substituents from among the halogens, optionally substituted amino, amide, aldehyde, keto, alkylcarbonyl, carboxy, mercapto, cyano, hydroxy, alkoxy, alkoxycarbonyl, sulfonyl, phosphoryl, (meth)acryloxy, epoxy or vinyl groups;

m=1, 2 or 3, where at least one organically modified silane of formula I with at least one residue R' that contains at least one (poly) addable and/or polymerizable group is used in an amount from 2 to 95 mol %, with respect to the total number of mols of the monomer starting components;

b) at least one metal compound of the general formula II and/or III $$AlR_3 \quad (II)$$

$$MR_4 \quad (III)$$

in which the residues are the same or different and have the following meanings:

M=zirconium or titanium,

R=halogen, alkyl, alkoxy, acyloxy, hydroxy or a chelate ligand, where the compounds of formulas II and/or III are used in an amount from 5 to 75 mol %, with respect to the total number of mols of monomer starting components;

c) at least one organically modified silane of the general formula IV $$R_m'''SiX_{(4-m)} \quad (IV)$$

in which the residues are the same or different and have the following meanings:

R'''=alkyl, alkenyl, alkynyl, aryl, arylalkyl, alkylaryl, arylalkenyl, alkenylaryl, arylalkynyl or alkynyllaryl, where these residues can be interrupted by O and/or by S atoms and/or by the group NR" and optionally have one or more substituents select from the group consisting of the halogens, optionally substituted amino, amide, aldehyde, keto, alkylcarbonyl, carboxy, mercapto, cyano, hydroxy, alkoxy, alkoxycarbonyl, sulfonyl, phosphoryl, (meth)acryloxy, epoxy and vinyl groups, where residue R''' is at least partially fluorinated;

X=hydrogen, halogen, alkoxy, acyloxy, alkylcarbonyl, alkoxycarbonyl or NR"$_2$, with R" being hydrogen and/or alkyl;

m=1, 2 or 3, where the compounds of the general formula IV are used in an amount from 0.05 to 50 mol % with respect to the total number of mols of the monomer starting components;

the hydrolytic condensation of the components (a) to (c) is carried out so that either the compound(s) of formula IV is/are mixed with the compound of formulas I and II and/or III before the addition of water or moisture and then the compound of formulas I, II and/or III and IV are jointly hydrolyzed and condensed, or the compounds of formulas I and II and/or III are first hydrolyzed and condensed and then the compound(s) of formula IV is/are added to the resulting condensate;

the mixture resulting after the addition of the compounds of formula IV is allowed to react for at least 4 h at temperatures of at least 20° C.;

before, during or after the hydrolytic condensation a monomer and/or oligomer and/or prepolymer that is polyaddable and/or copolymerizable with the residue R' of the compound of the general Formula I is added in an amount from 2 to 70 mol % with respect to the total number of mols of the monomer starting components.

2. A method as in claim 1, which is characterized by the fact that, besides components (a) to (c), at least one nonvolatile oxide that is optionally soluble in the reaction medium or a compound of elements of the main group Ia to Va or their side groups IIb, IIIb, Vb to VIIIb of the Periodic Table that forms such a nonvolatile oxide, with the exception of aluminum, is used as an additional component.

3. A method as in claim 1 wherein the hydrolytic condensation is carried out in the presence of a condensation catalyst.

4. A method as in claim 1, wherein the hydrolytic condensation is carried out in the presence of a solvent.

5. A method as in claim 1, wherein the amount of water used for hydrolytic condensation is supplied by means of moisture-laden adsorbents, water-containing organic solvents, salt hydrates or water-forming systems.

6. A method as in claim 1, wherein before, during or after the hydrolytic condensation, one or more additives that are chosen from organic diluents, flow control agents, colorants, UV stabilizers, fillers, viscosity regulators, lubricants, wetting agents, suspension agents or oxidation inhibitors, is/are added.

7. A method as in claim 1, wherein before, during or after the hydrolytic condensation, one or more pigments with a particle size from 1 to 6 $\mu$m is/are added in an amount from 0.5 to 8 wt %.

8. A method as in claim 1, wherein before, during or after the hydrolytic condensation, one or more pigments is/are added in an amount of over 25 wt %.

9. A method as in claim 1, wherein the compound of formula I is added in an amount from 20 to 90 mol %, with respect to the total number of mols of the monomer starting components.

10. A method as in claim 1, wherein the compounds of formulas II and/or III are added in an amount from 5 to 60 mol %, with respect to the total number of mols of the monomer starting components.

11. A method as in claim 1, wherein the compounds of formula IV are added in an amount from 0.1 to 10 mol %, with respect to the total number of mols of the monomer starting components.

12. A method as in claim 1, wherein after the addition of the compounds of formula IV the resulting mixture is allowed to react for at least 4 h at a temperature of at least 40° C.

13. A method as in claim 1, wherein after the addition of the compounds of formula IV the resulting mixture is allowed to react for at least 24 h at temperature of at least 10° C.

14. A method as in claim 1, wherein a compound IV with a partially fluorinated aliphatic and/or aromatic residue R''' is used as (c).

15. A method as in claim 1, wherein a compound IV with a perfluorinated aliphatic and/or aromatic residue R''' is used as (c).

* * * * *